March 26, 1968 J. P. POOLE 3,375,095

TREATMENT OF MELTING GLASS WITH SO₂

Filed Oct. 9, 1964

INVENTOR.
JAMES P. POOLE
BY
Christel & Bean
ATTORNEYS 3,375,095
TREATMENT OF MELTING GLASS WITH SO₂
James P. Poole, Brockport, Pa., assignor to Brockway
Glass Company, Inc., Brockway, Pa.
Filed Oct. 9, 1964, Ser. No. 402,732
6 Claims. (Cl. 65—134)

ABSTRACT OF THE DISCLOSURE

In a continuous glass melting furnace wherein raw batch materials are continuously introduced at one end of the melting tank and molten glass is continuously withdrawn from the other, the improvement of substantially continuously discharging gaseous $SO_2$ in the molten glass body at the batch feeding end of the melting tank and adjacent to the body of the tank whereby the $SO_2$ rises through the molten glass to the surface and thus forms a sulfate-rich surface layer which dissolves silica scum at the surface of the molten glass body.

---

Figure 1:
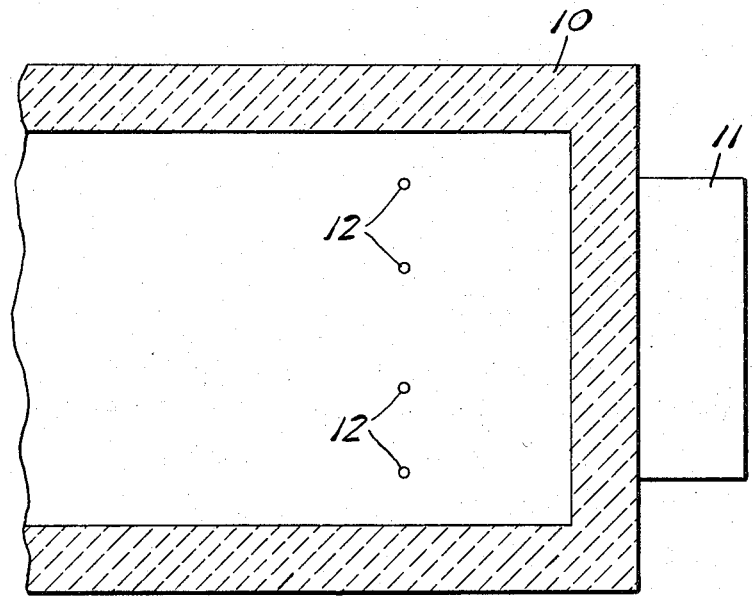

This invention relates to glass melting and particularly to the improvement of the melting process by introducing gaseous sulfate to the melt at the batch end of a glass melting furnace.

It is conventional in commercial glass melting to add so-called "salt cake" (sodium sulfate) in the glass batch to assist in the final solution of any silica remaining in the melting phase. Silica has a low density relative to glass and therefore silica remnants float on the molten glass and form a scum which is difficult to dissolve. The salt cake is used to dissolve the silica scum and keep the surface of the melt clean.

Glass melts containing sulfates often show a liquid phase separation. The sulfate-rich phase is less dense and collects at the surface of the melt. This surface layer is known in the art as "sulfate gall" and, if too much salt cake is used, may cause seeds and blisters to develop in the final glass. However, when used in proper proportion, the sulfate-rich layer dissolves the silica scum and keeps the melt surface clean.

The tendency of the salt cake to concentrate at the melt surface is the main reason for the high $Na_2SO_4$ level in the carry-over of most glass furnaces. Salt cake decomposes according to the following reaction:

$$Na_2SO_4 \rightleftarrows Na_2O + \tfrac{1}{2}O_2$$

This decomposition is catalyzed by the presence of water vapor which is introduced by the combustion gases. It has further been noted that the sodium oxide must decompose before it will volatilize and does so as follows:

$$Na_2O \rightleftarrows 2Na^\circ + \tfrac{1}{2}O_2$$

Consequently, the total reaction becomes:

$$Na_2SO_4 \rightleftarrows 2Na^\circ + SO_2 + O_2$$

Conditions at the glass melt surface drive the above equilibrium to the right while the same equilibrium is to the left in the regenerator chamber. The net effect is the transfer of $Na_2SO_4$ from the glass melt surface to the checkers. Examination of the above equations clearly indicates that any partial pressure of $SO_2$ (or $O_2$ for that matter) will suppress the decomposition in the sulfate layer and thus reduce the effective volatilization rate of sodium sulfate.

I have found that much improved glass melting and fining results are attained by introducing sulfate to molten or melting glass at the batch end of a continuous glass melting furnace in the form of a sulfate containing gas, for instance, sulfur dioxide gas. This may be accomplished by bubbling $SO_2$ upwardly through the molten glass from the bottom of the tank. Similar results may be obtained by using a water cooled lance which projects into the melt from above and discharges $SO_2$ into the melt. The $SO_2$ may also be introduced into the furnace interior by mixing the same with the fuel gas with which the furnace is fired.

As with other bubblers of the prior art, the release of $SO_2$ gas in the melt and the rising thereof through the molten glass causes a stirring or mechanical agitation of the glass which promotes melting, homogenization and fining of the glass.

In introducing gaseous $SO_2$ into or above melting glass it has been found that a further significant advantage is gained. When glass is melted in an atmosphere of or containing $SO_2$ the $SO_2$ has a catalytic effect on the solution of sand grains into the melt. When the $SO_2$ is introduced directly into the melt this reaction and solution is practically instantaneous.

This catalytic behavior is present even when $SO_2$ is bubbled through a melt which is sulfate-free. It is accordingly believed that the $SO_2$ atmosphere may affect the wetting characteristics of the sand-glass system and that the benefits of the $SO_2$ atmosphere in this connection may be equal or greater in importance to the benefits resulting from the provision of a sulfate-rich surface layer on the glass melt.

While several embodiments of methods and apparatus for practicing the present invention are disclosed herein and illustrated schematically in the accompanying drawing, it is to be understood that these embodiments are by way of example only and that the invention is not limited as to scope to such embodiments, nor otherwise than as defined in the appended claims.

Figure 2:
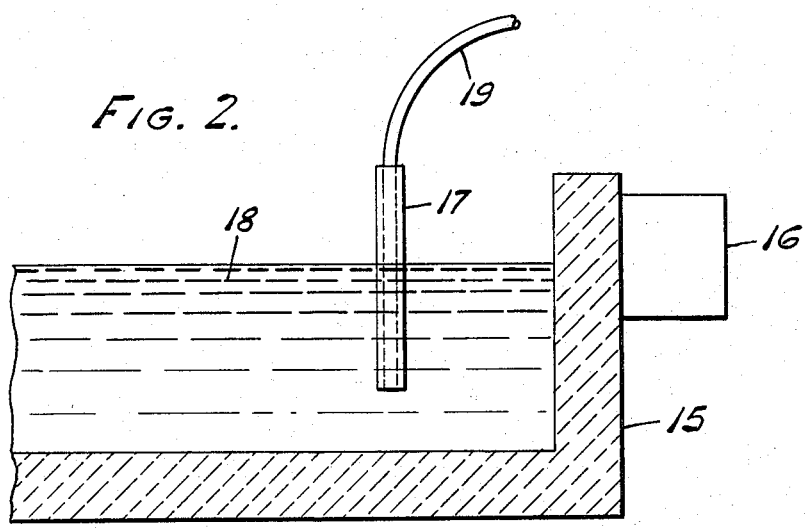

In the drawing:

FIG. 1 is a fragmentary top plan view of the batch feeding or doghouse end of a continuous glass melting tank furnace equipped with passages in the floor thereof for introducing $SO_2$ to the molten glass; and FIG. 2 is a fragmentary longitudinal cross-sectional view through the batch feeding or doghouse end of a continuous tank type glass furnace showing another form of means for releasing $SO_2$ gas within the molten glass in the tank.

In FIG. 1 a generally conventional tank type glass melting furnace is designated 10 and the numeral 11 indicates somewhat schematically the doghouse or batch feeder therefor. As indicated at 12 in FIG. 1, passages in the floor of the tank 10 discharge into the bottom of the interior of the tank and $SO_2$ gas is thus released within the molten glass.

In the embodiment of FIG. 2, a glass melting tank furnace is designated 15, a batch feeder therefore is designated 16 and the numeral 17 designates one of a lateral series of spaced refractory tubular members which extend into the molten glass 18 to release $SO_2$ gas from the lower ends of the refractory tubes or lances 17. In FIG. 2 the numeral 19 designates a conduit which introduces $SO_2$ gas to the upper end of each of the lances 17. The latter are preferably water cooled in a manner which is known in the refractory arts.

The amount of $SO_2$, or rather the rate of discharge thereof in the glass in the melting tank, will vary with batch composition and other factors and will therefore be determined empirically to suit various operating conditions. However, as a general guide, I have found that, in a continuous tank furnace from which about 80 tons of glass per day is being withdrawn, the discharge of $SO_2$ in the glass at the batch feeding end should be in the general range of from 12 to 24 cubic feet per hour.

Measured another way, and having in mind that glass melting tank operators are quite familiar with the sodium sulfate "salt cake" which is conventionally added to glass batches and the quantities of salt cake which are required, I have found that between 3.0 and 3.1 cubic feet per hour of $SO_2$ should be released in the molten glass to replace each pound of salt cake per hour normally employed. Other sulfates such as gypsum (calcium sulfate) and barytes (barium sulfate) are sometimes used in place of or in addition to salt cake (sodium sulfate). All of these sulfate producers in the melt accomplish the same thing, i.e., they aid in the dissolution of the sand into the melt. The term "salt cake" as used in the claims applies to any of these sulfate containing addition materials.

Thus if a given furnace under a given load is being supplied with 6 pounds of salt cake per hour, it will take about 18 to 18.6 cubic feet per hour of $SO_2$ for replacement thereof. It may be noted that the $SO_2$ may be used to replace the salt cake entirely or only in part. That is, a combination of salt cake and $SO_2$ may be employed if desired.

What is claimed is:

1. In a method of melting batch materials to form molten glass in a continuous glass melting tank having a batch feeding end and a glass discharge end, the step which comprises substantially continuously discharging $SO_2$ in the molten glass body adjacent to the bottom of said body and adjacent to the batch feeding end of said tank, whereby said $SO_2$ rises through the molten glass to the surface thereof to form a sulfate-rich surface layer for dissolving silica scum at the surface of said molten glass body.

2. In a method of melting batch materials to form molten glass in a continuous glass melting tank having a batch feeding end and a glass discharge end, the step which comprises substantially continuously discharging $SO_2$ in the molten glass body adjacent to the bottom of said body and adjacent to the batch feeding end of said tank.

3. In a method of melting batch materials to form molten glass in a continuous glass melting tank having a batch feeding end and a glass discharge end, the step which comprises substantially continuously discharging $SO_2$ into contact with the molten glass adjacent to the batch feeding end of said tank whereby said $SO_2$ forms a sulfate-rich surface layer for dissolving silica scum at the surface of said molten glass body.

4. In a method of melting batch materials to form molten glass in a continuous glass melting tank having a batch feeding end and a glass discharge end, the step which comprises substantially continuously discharging $SO_2$ into contact with the molten glass adjacent to the batch feeding end of said tank.

5. The method of melting batch materials to form molten glass in a continuous glass melting tank having a batch feeding end and a glass discharge end, the step which comprises substantially continuously discharging $SO_2$ in the molten glass body adjacent to the bottom of said body and adjacent to the batch feeding end of said tank at the rate of from about 1 to 7 cubic feet per hour of $SO_2$ for each pound of salt cake replaced thereby whereby said $SO_2$ rises through the molten glass to the surface thereof to form a sulfate-rich surface layer for dissolving silica scum at the surface of said molten glass body.

6. The method of melting batch materials to form molten glass in a continuous glass melting tank having a batch feeding end and a glass discharge end, the step which comprises substantially continuously discharging $SO_2$ in the molten glass body adjacent to the bottom of said body and adjacent to the batch feeding end of said tank at the rate of from about 3.6 to 7.2 cubic feet per hour of $SO_2$ for each pound of salt cake replaced thereby.

References Cited
UNITED STATES PATENTS

| | | | |
|---|---|---|---|
| 2,387,222 | 10/1945 | Wright | 65—32 |
| 3,208,841 | 9/1965 | Burch | 65—179 |
| 3,240,581 | 3/1966 | O'Connell et al. | 65—134 X |
| 3,305,340 | 2/1967 | Atkeson | 65—134 |

DONALL H. SYLVESTER, *Primary Examiner.*

S. LEON BASHORE, *Examiner.*

F. W. MIGA, *Assistant Examiner.*